(No Model.)

C. D. ROGERS.
SCREW.

No. 255,816. Patented Apr. 4, 1882.

WITNESSES.
W. H. Thurston
J. Knight

INVENTOR
Charles D. Rogers

United States Patent Office.

CHARLES D. ROGERS, OF PROVIDENCE, RHODE ISLAND, ASSIGNOR TO THE AMERICAN SCREW COMPANY, OF SAME PLACE.

SCREW.

SPECIFICATION forming part of Letters Patent No. 255,816, dated April 4, 1882.

Application filed December 23, 1881. (No model.)

*To all whom it may concern:*

Be it known that I, CHARLES D. ROGERS, of the city and county of Providence, and State of Rhode Island, have invented a new and useful Improvement in Screws; and I do hereby declare that the following specification, taken in connection with the accompanying drawings, forming a part of the same, is a full, clear, and exact description thereof.

My improvement consists in providing an iron screw with a steel core, or, in other words, producing a screw having a central portion of steel and a surrounding or outside portion of iron.

A screw composed wholly of steel is open to two objections. First, the tools employed for threading the shank wear out very fast, owing to the hardness of the steel, and the threading-machines have to be run comparatively slowly; second, the screw, when finished, (unless it is annealed, which is comparatively expensive and objectionable,) is brittle. Therefore the head is liable to split and the shank to break.

The object of my improvement is to strengthen an iron screw and yet obviate the disadvantages of one composed wholly of steel.

Figure 1:
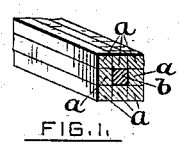
Figure 2:
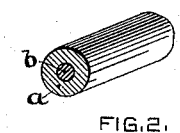
Figure 3:
Figure 4:
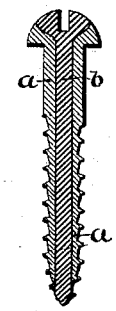

Referring to the drawings, Figure 1 represents in perspective a billet with a steel core. Fig. 2 shows a rod rolled from said billet. Figs. 3 and 4 represent my improved screws having flat and round heads, respectively.

My improved screws may be produced from rods having a central portion of steel and an outer portion or covering of iron securely attached to each other. Such a rod can be successfully made by welding or fusing together at the proper heat rods $a$ of iron and a central rod, $b$, of steel in the form of a billet, as shown in Fig. 1; then rolling the billet into a round rod, as shown in Fig. 2. From this rod screw-blanks are formed in the usual manner, and said blanks are threaded and nicked in the usual machinery.

As will be seen by an examination of Figs. 3 and 4, that portion of the screw which is acted upon by the cutting-tools is of iron, except at the extreme point and the central portion of the head, which are of steel. In heading the blanks the steel flows outward with the iron, producing a head having a steel central portion which is surrounded by iron. The walls of the nick, therefore, are less likely to be indented by the driver than when the head is wholly of iron, and the head is stronger than if made wholly of steel, since the steel, which is comparatively brittle, is bound about by iron. The screw has a further advantage of a comparatively hard point surmounted by a strong shank.

My improvement is well adapted to bolts, rivets, and nails; and such articles, when made with a central core of steel, will possess advantages over those made wholly of iron or steel.

What I claim as my invention, and desire to secure by Letters Patent, is—

As an improved article of manufacture, a screw having a steel core and a surrounding iron shell welded to the core, substantially as set forth.

CHARLES D. ROGERS.

Witnesses:
W. H. THURSTON,
I. KNIGHT.